(12) United States Patent
Bertan et al.

(10) Patent No.: US 10,489,643 B2
(45) Date of Patent: Nov. 26, 2019

(54) IDENTITY DOCUMENT VALIDATION USING BIOMETRIC IMAGE DATA

(71) Applicant: MorphoTrust USA, LLC, Billerica, MA (US)

(72) Inventors: Brian Bertan, Merrick, NY (US); Brian K. Martin, McMurray, PA (US)

(73) Assignee: MorphoTrust USA, LLC, Billerica, MA (US)

( * ) Notice: Subject to any disclaimer, the term of this patent is extended or adjusted under 35 U.S.C. 154(b) by 144 days.

(21) Appl. No.: 15/859,115

(22) Filed: Dec. 29, 2017

(65) Prior Publication Data

US 2018/0189561 A1 Jul. 5, 2018

Related U.S. Application Data

(60) Provisional application No. 62/440,928, filed on Dec. 30, 2016.

(51) Int. Cl.
*G06K 9/00* (2006.01)
*G06F 21/32* (2013.01)

(52) U.S. Cl.
CPC ......... *G06K 9/00449* (2013.01); *G06F 21/32* (2013.01); *G06K 9/00288* (2013.01); *G06K 9/00892* (2013.01); *G06K 2209/01* (2013.01)

(58) Field of Classification Search
CPC ........... G06K 9/00449; G06K 9/00892; G06K 9/00288; G06K 2209/01; G06F 21/32
See application file for complete search history.

(56) References Cited

U.S. PATENT DOCUMENTS

| 7,708,189 B1 | 5/2010 | Cipriano |
| 10,257,495 B1 * | 4/2019 | Poder ................. G06K 9/00288 |
| 2004/0165755 A1 | 8/2004 | Hillhouse |

(Continued)

OTHER PUBLICATIONS

International Search Report and Written Opinion in International Application No. PCT/US17/69029, dated Mar. 26, 2018, 2 pages.

*Primary Examiner* — Aaron W Carter
(74) *Attorney, Agent, or Firm* — Fish & Richardson P.C.

(57) ABSTRACT

A computer-implemented method is described and includes a computing device receiving an image of an identification document of an individual. The method includes detecting, by the computing device and based on the received image, identifying data about the individual, the identifying data including text fields; and detecting, by the device and based on the received image, biometric attributes of the individual. The method further includes the device determining a first confidence score associated with a first biometric attribute of the individual that is detected by the device; and determining a second confidence score associated with a first text field of the detected identifying data. The first text field can correspond to the first biometric attribute. The method includes the device comparing the first biometric attribute and the first text field using at least the first confidence score and the second confidence score. Based on the comparison, the device can either execute a feedback operation to repeat detection of at least the identifying data and biometric data, or provide an indication associated with the authenticity of the identification document of the individual.

23 Claims, 4 Drawing Sheets

(56) References Cited

U.S. PATENT DOCUMENTS

| | | | |
|---|---|---|---|
| 2006/0157559 A1* | 7/2006 | Levy | G06K 17/00 235/380 |
| 2006/0202012 A1* | 9/2006 | Grano | G06Q 20/04 235/379 |
| 2008/0149713 A1* | 6/2008 | Brundage | G06T 1/0071 235/435 |
| 2009/0052751 A1* | 2/2009 | Chaney | G06F 21/33 382/120 |
| 2012/0075442 A1* | 3/2012 | Vujic | G07C 9/00087 348/61 |
| 2012/0226600 A1* | 9/2012 | Dolev | G06K 9/6203 705/38 |
| 2014/0270642 A1 | 9/2014 | Frish | |
| 2014/0279516 A1* | 9/2014 | Rellas | G06Q 30/0185 705/44 |
| 2014/0279642 A1* | 9/2014 | Strange | G06Q 50/265 705/325 |
| 2015/0029216 A1* | 1/2015 | Martin | G06K 9/00228 345/626 |
| 2015/0078671 A1* | 3/2015 | van Deventer | G06K 9/00463 382/217 |
| 2015/0086088 A1* | 3/2015 | King | G06K 9/00906 382/118 |
| 2015/0341370 A1 | 11/2015 | Khan | |
| 2015/0347839 A1 | 12/2015 | Hagen | |
| 2017/0032485 A1* | 2/2017 | Vemury | G06Q 50/265 |
| 2017/0236017 A1* | 8/2017 | Neumann | G06K 9/00885 382/115 |
| 2018/0060874 A1* | 3/2018 | Kelts | H04L 63/126 |
| 2018/0107887 A1* | 4/2018 | Huber, Jr. | G06K 9/00449 |
| 2018/0130108 A1* | 5/2018 | Wu | G06K 9/00288 |
| 2018/0186167 A1* | 7/2018 | Jones | B42D 25/305 |
| 2018/0189561 A1* | 7/2018 | Bertan | G06F 21/32 |
| 2018/0189583 A1* | 7/2018 | Wohlken | G06K 9/00926 |
| 2018/0189605 A1* | 7/2018 | Wu | B42D 25/23 |
| 2018/0260617 A1* | 9/2018 | Jones | G06K 9/00288 |
| 2019/0034610 A1* | 1/2019 | Miu | G06F 21/32 |
| 2019/0205617 A1* | 7/2019 | Bertan | G06K 9/00255 |

* cited by examiner

IDENTITY DOCUMENT VALIDATION USING BIOMETRIC IMAGE DATA

TECHNICAL FIELD

The following disclosure relates generally to validating identity document data against biometric image data.

BACKGROUND

Some systems use biometric information to authenticate individuals rendering identification documents or individuals attempting to obtain identification documents. For example, state motor vehicle departments may obtain facial images and fingerprints of drivers at the time of providing driver's licenses. Some systems can use biometric information in combination with physical or digital identification cards to verify that an individual is enrolled in an example identity management program. For example, an individual may have to provide facial images and fingerprints as well as valid identification when he or she attempts to renew her driver's license or engage in airline travel. In some instances, individuals may attempt to use a fraudulent identification card as a means of identity verification.

SUMMARY

In one aspect of the specification, a computer-implemented method for identity document data validation using biometric image data is described. The method includes receiving, by a computing device, an image of an identification document of an individual. The method further includes detecting, by the computing device and based on the received image, identifying data about the individual, the identifying data including one or more text fields; and detecting, by the computing device and based on the received image, one or more biometric attributes of the individual.

The method further includes determining, by the computing device, a first confidence score associated with a first biometric attribute of the individual that is detected by the computing device; and determining, by the computing device, a second confidence score associated with a first text field of the detected identifying data, the first text field corresponding to the first biometric attribute. The method further includes comparing, by the computing device, the first biometric attribute and the first text field using at least the first confidence score and the second confidence score; and based on comparing, providing, by the computing device, an indication associated with the authenticity of the identification document of the individual.

In some implementations, the received image of the identification document includes a digital image of the individual and detecting the one or more biometric attributes of the individual, includes: executing, by the computing device, program code to analyze physical human features viewable in the digital image; and identifying, by the computing device, the one or more biometric attributes of the individual based on the analyzed physical human features.

In some implementations, the detected one or more biometric attributes of the individual includes at least one of: a height of the individual; eye color of the individual; a hair color of the individual; an age of the individual; or a gender of the individual. In some implementations, determining the first confidence score associated with the first biometric attribute of the individual, includes: analyzing, by the computing device, the digital image of the individual; and based on analyzing, providing, by the computing device, an indication of the extent to which the detected first biometric attribute matches a particular physical human feature of the individual.

In some implementations, the identifying data including the one or more text fields corresponds to text describing biometric attributes of the individual; and detecting, includes: using, by the computing device, an optical character recognition (OCR) algorithm to scan and recognize text characters of the one or more text fields. In some implementations, the identification document includes text describing one or more biometric attributes of the individual, and wherein the detected identifying data about the individual is scanned and extracted from the received image of the identification document.

In some implementations, determining the second confidence score associated with the first text field, includes: analyzing, by the computing device, text characters of the one or more text fields; and based on analyzing, providing, by the computing device, an indication of the extent to which the first text field of the detected identifying data matches a particular text field of the identification document.

In some implementations, further includes: processing, by the computing device, the received image of the identification document of the individual, wherein processing enhances a digital characteristic of the identifying data about the individual. In some implementations, receiving the image of the identification document of the individual includes at least one of: capturing, by the computing device, a digital image of the identification document; scanning, by the computing device, the identification document; and receiving, by the computing device, manually entered identifying data about the individual.

In some implementations, the method further includes: detecting, by the computing device, at least one encoded data item associated with the identification document of the individual; and determining, by the computing device, a third confidence score associated with decoded data that corresponds to the detected at least one encoded data item.

Implementations of techniques described in this specification include methods, systems, computer program products and computer-readable media. One such computer program product is suitably embodied in a non-transitory machine-readable medium that stores instructions executable by one or more processors. The instructions are configured to cause the one or more processors to perform one or more actions described in this specification. One such computer-readable medium stores instructions that, when executed by a processor, are configured to cause the processor to perform one or more of the actions described herein. One such system includes one or more processors and a storage device storing instructions that, when executed by the one or more processors, cause the one or more processors to perform the actions described herein.

The details of one or more disclosed implementations are set forth in the accompanying drawings and the description below. Other features, aspects, and advantages will become apparent from the description, the drawings and the claims.

DETAILED DESCRIPTION

Identification documents such as driver's license typically include identifying data including biometric data as well as a photographic image of the holder or owner of the identification document. Biometric data can include eye color, hair color, height, gender and age which are populated in appropriate text fields, barcodes, digital watermarks and other encodings of the identification document. Photographic image data affixed to an identification document can include a portrait capturing an individual's face and can include other identifying images as well.

The systems and methods described in this specification exploit redundancy of the biometric data that exists, for example, between the photographic image and text fields of the identification document. The described systems and methods exploit redundancy of the biometric data for leverage in analyzing identification documents to either verify the documents accuracy/authenticity or indicate a discrepancy associated with the identification document. The described systems and methods also verify that data associated with biometric information contained in text fields, barcodes, digital watermarks and other encodings in identification documents is consistent with biometric data derived, scan, or otherwise extracted from associated photographic images.

The systems and methods described herein can be used to: 1) detect data acquisition errors during enrollment of an individual in an example identity management program; 2) improve production quality assurance of identification documents; 3) verify the identification document against alteration and/or forgery; 4) improve the accuracy of automated reading of identification documents; or 5) enable faster and more efficient reading of identification documents.

Figure 1:
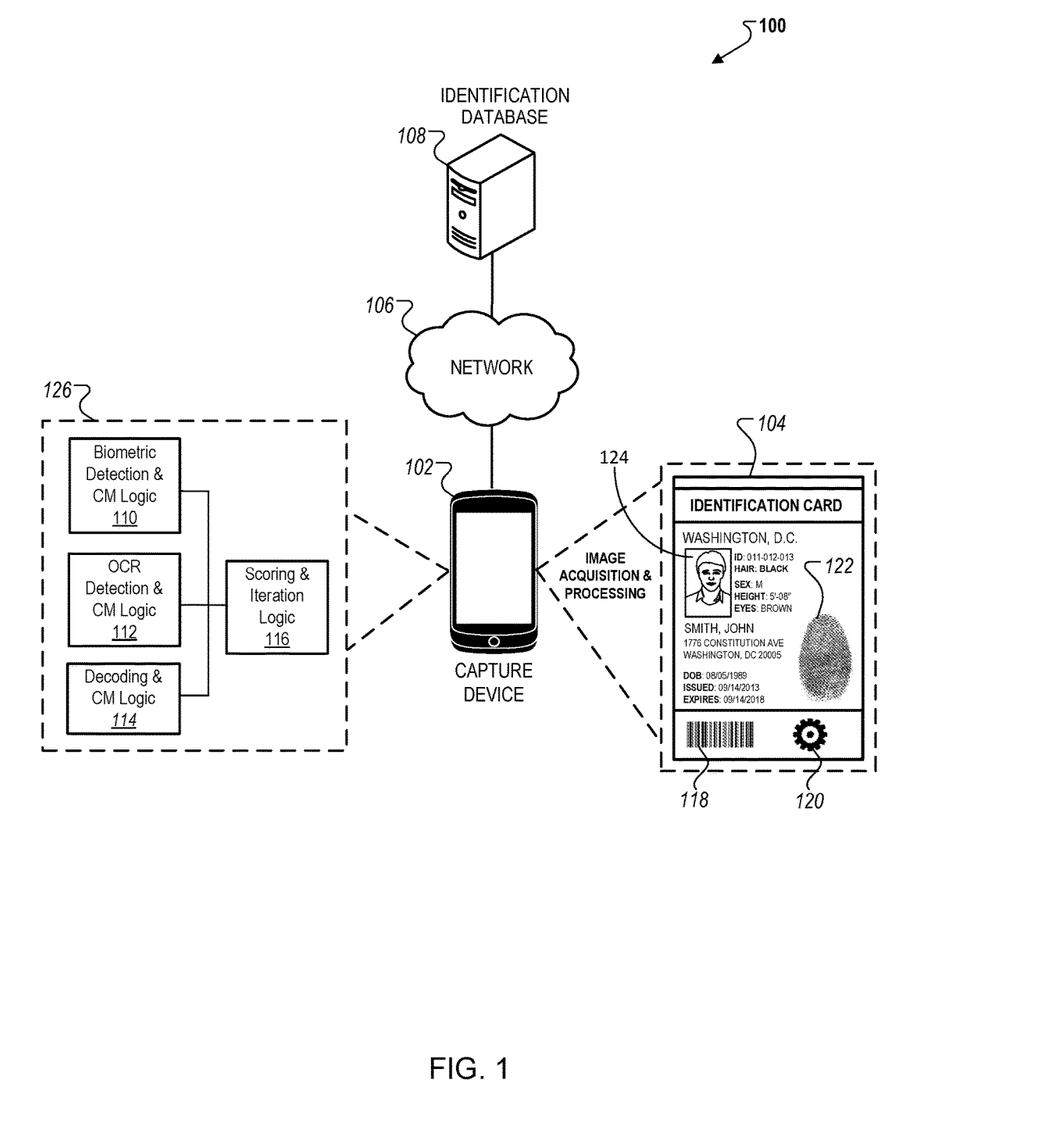
FIG. 1 illustrates an example system for acquiring information for identity document data validation.

FIG. 1 illustrates an example system 100 for acquiring information for identity document data validation. System 100 generally includes computing device 102, identification (ID) document 104, and identification database 108. Computing device 102 can be an example device such as a smartphone, a mobile computing device, a laptop/desktop computer, a tablet device, or other related computing device. Computing device 102 can generally include a logic grouping 126 that includes modules that are used by device 102 to receive process data associated with identification document 104.

Identification database 108 can be used to verify data associated with identification document 104 and photographic images of an individual that are scanned, captured, or otherwise received by system 100. In some implementations, identification database 108 can use real-time lookup/ search functions to perform data verification against source-of-truth databases maintained by a variety of government and commercial entities. Database 108 can receive, from computing device 102, data associated with identification document 104 by way of network 106.

Logic grouping 126 can include one or more modules that are configured to execute program code or software instructions that cause device 102 to perform one or more desired functions. As shown, in the implementation of FIG. 1, logic grouping 126 can generally include biometric detection and confidence measurement (CM) logic 110, optical character recognition (OCR) detection and CM logic 112, data decoding and confidence measurement logic 114, and scoring/ iteration logic 116. The technical functions enabled by logic 110, 112, 114, and 116 are described in greater detail below in the implementation of FIG. 2.

As shown, ID document 104 generally includes encoded data 118, indicator 120, biometric marker 122, photographic image 124, and text fields 128. In some implementations, encoded data 118 is a barcode that encodes identifying data about the holder or owner of identification document 104. Encoded data 118 can thus be scanned and decoded to detect or determine the identifying data associated with the cardholder.

In some implementations, biometric marker 122 can correspond to a human fingerprint or other related biometric markers such as a palm print. Photographic image 124 can be a facial image, a partial body image, or a full body image of the cardholder. As described in more detail below with reference to FIG. 2, photographic image 124 can be used to calculate or determine at least one of the age, height, gender, or multiple other biometric attributes of an individual or cardholder of identification document 104.

In some implementations, indicator 120 can correspond to a watermark or related entity indicator that associates identification document 104 with a particular state, jurisdiction or private entity/company. As shown, text fields 128 can include one or more text fields including multiple text characters. As shown, the text/text characters of text fields 128, as arranged, describe multiple identifying data items about the individual or cardholder including, for example, biometric attributes such as eye color, gender, age, height, or other related biometric attributes.

In general, logic grouping 126 are representative of a subset of data processing, and/or data scanning, extraction and analysis functions that can be executed by device 102. As used in this specification, the term "module" is intended to include, but is not limited to, one or more computers configured to execute one or more software programs that include program code that causes a processing device(s) or unit(s) of the computer to execute one or more functions. The term "computer" is intended to include any data processing device, such as a desktop computer, a laptop computer, a mainframe computer, a personal digital assistant, a server, a handheld device, or any other device able to process data.

Computing device 102 and associated modules can each include processing units or devices that can include one or more processors (e.g., microprocessors or central processing units (CPUs)), graphics processing units (GPUs), application specific integrated circuits (ASICs), or a combination of different processors. In general, these processors execute program code or instructions associated with the individual logic constructs of logic grouping 126.

In alternative embodiments, device 102 and associated modules can each include other computing resources/devices (e.g., cloud-based servers). These computing resources can provide additional processing options for executing program code or instructions associated with the individual logic constructs of logic grouping 126. Further, these computing resources can be used to perform one or more of the extraction, analysis, scanning, detection, or determinations described in this specification.

The processing units or devices can further include one or more memory units or memory banks. In some implementations, the processing units execute programmed instructions stored in memory to cause device 102 and associated modules to perform one or more functions described in this specification. The memory units/banks can include one or more non-transitory machine-readable storage mediums. The non-transitory machine-readable storage medium can include solid-state memory, magnetic disk, and optical disk, a random access memory (RAM), a read-only memory (ROM), an erasable programmable read-only memory (e.g., EPROM, EEPROM, or Flash memory), or any other tangible medium capable of storing information.

Figure 2:
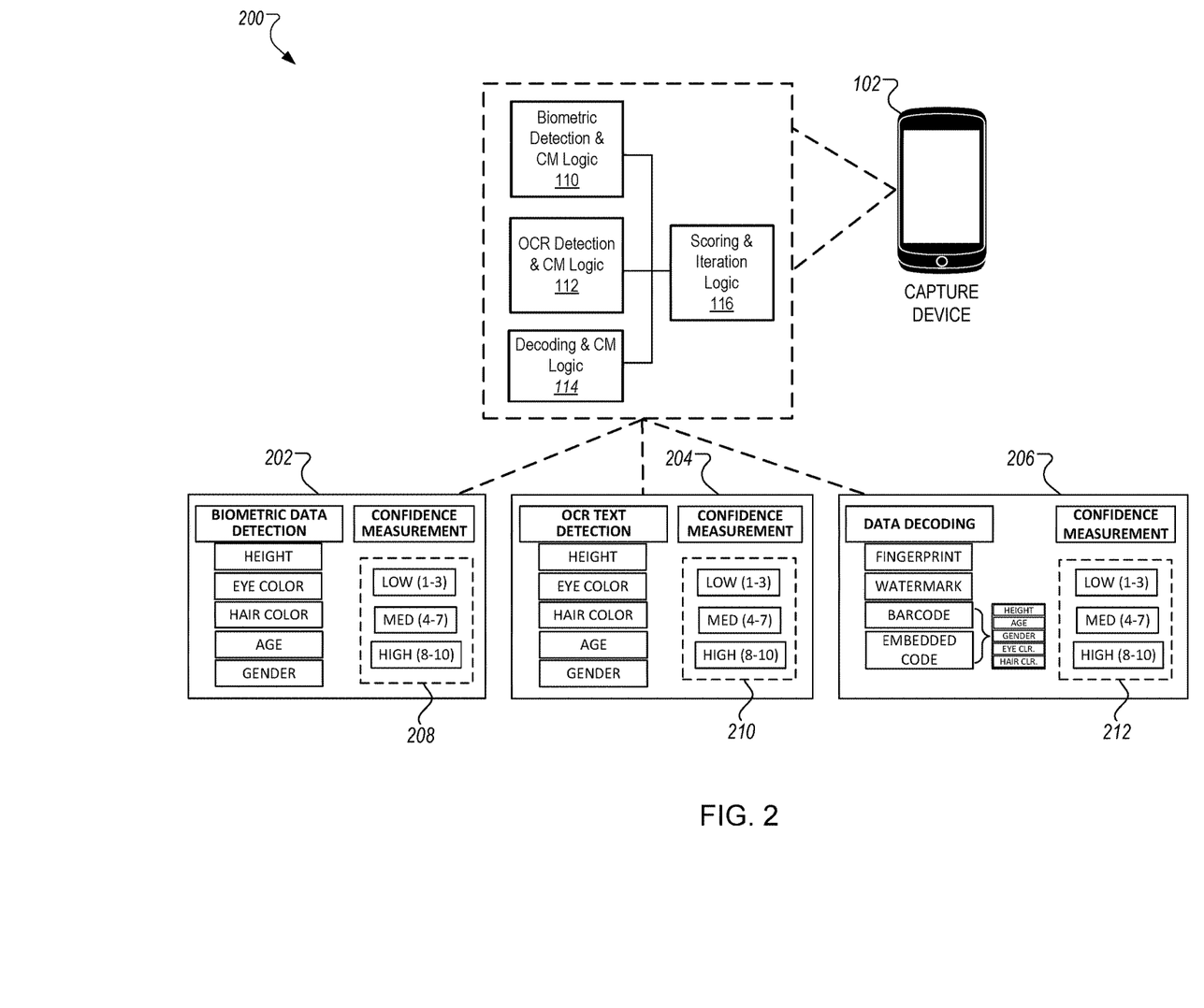
FIG. 2 illustrates a block diagram including data structures used for identity document data validation.

FIG. 2 illustrates a block diagram including multiple data structures that can be referenced for identity document data validation. In some implementations, system 200 is a subsystem of system 100 and includes distinct data structures that are associated with respective logic blocks of logic groupings 126. In general, system 200 cooperates with system 100 to enable data validation of identification document 104.

System 200 generally includes biometric data structure 202, text data structure 204, encoded data structure 206. As shown, each data structure 202, 204, 206, includes a respective data grouping and corresponding confidence measurement (CM) blocks 208, 210, and 212. Each data structure 202, 204, 206 includes data groupings that correspond to the descriptor of the data structure.

For example, as shown, biometric data structure 202 includes a data grouping of biometric attributes that can be detected based on analysis of identification document 104. Likewise, text data structure 204 includes a data grouping of identifying data (e.g., biometric attributes) that can be detected based on analysis of identification document 104. Further, encoded data structure 206 includes a data grouping of encoded data examples that can be detected and decoded based on analysis of identification document 104.

For respective data items in the data grouping of structure 202, CM block 208 can be referenced to determine or calculate a CM score (described as confidence score below) for detected biometric data scanned or extracted from ID document 104. Likewise, for respective data items in the data grouping of structure 204, CM block 210 can be referenced to determine a CM score for detected identifying data scanned or extracted from ID document 104. Further, for respective data items in the data grouping of structure 206, CM block 212 can be referenced to determine a CM score for detected and decoded data scanned or extracted from identification document 104.

In the implementation of FIG. 2, biometric detection and CM logic 110 can reference biometric data structures 202 for data validation of ID document 104, OCR detection and CM logic 112 can reference text data structures 204 for data validation of ID document 104, data decoding and CM logic 114 can reference encoded data structures 206 for data validation of ID document 104, and scoring/iteration logic 116 can reference CM scores 208, 210, 212 for data validation of ID document 104.

During an example operation, to validate data associated with ID document 104 for a particular individual/cardholder, systems 100, 200 cooperate to receive an image of ID document 104. In some implementations, receiving the image of ID document 104 includes at least one of: computing device 102 capturing a digital image of identification document 104; computing device 102 scanning identification document 104; and computing device 102 receiving manually entered identifying data about the individual. For example, a user interacting with device 102 to authenticate the individual or validate information about ID document 104 can manually enter identifying data about the individual or the ID document.

In the example operation, computing device 102 detects one or more biometric attributes about the individual. In some implementations, the received image of ID document 104 includes a digital image of the individual. Detecting the one or more biometric attributes of the individual can include, computing device 102 executing program code to analyze physical human features viewable in the digital image. Additionally, detecting the one or more biometric attributes can further include computing device 102 identifying the one or more biometric attributes of the individual based on the analyzed physical human features.

In some implementations, the detected one or more biometric attributes of the individual corresponds to data items in the data grouping of structure 202. For example, the one or more biometric attributes can include at least one of: a height of the individual; eye color of the individual; a hair color of the individual; an age of the individual; or a gender of the individual. The digital image can be an electronic/digital representation of photographic image 124.

Referring again to the example operation, computing device 102 determines a first confidence score associated with a first biometric attribute of the individual that is detected by computing device 102. In some implementations, determining the first confidence score can include computing device 102 analyzing the digital image of the individual. Additionally, determining the first confidence score can be based on the analysis of the digital image, and can further include computing device 102 providing an indication of the extent to which the detected first biometric attribute matches a particular physical human feature of the individual.

For example, computing device 102 executes program code associated with logic 110 to analyze the digital image to calculate or estimate the height of the individual depicted in the image, calculate/estimate the eye color of the individual, or calculate/estimate the age of the individual. In some implementations, program code associated with scoring logic 116 receives parameter values corresponding to the analyzed preceding physical human features (i.e., height, eye color, age). Program code for scoring logic 116 is then executed to determine a corresponding confidence score with reference to data structure 202 and CM block 208.

The first confidence score represents the system confidence that, for example, the calculated age matches or substantially corresponds to the actual age of the individual depicted in the analyzed digital image. In some instances, the detected first biometric attribute is age 31 and the first confidence score is 5 (MED). In another instance, the detected first biometric attribute is height 6 ft and the first confidence score is 9 (HIGH). In yet another instance, the detected first biometric attribute is eye color brown and the first confidence score is 8 (HIGH).

Referring again to the example operation, computing device 102 detects identifying data about the individual. In some implementations, the detected identifying data is associated with the one or more text fields 128 and corresponds to text characters describing biometric attributes of the individual. Detecting the identifying data can include computing device 102 using an example OCR algorithm to scan and recognize text characters of the one or more text fields. In general, ID document 104 can include a variety of text that describes one or more biometric attributes of the individual.

The detected identifying data about the individual can be scanned and extracted (e.g., using OCR) from the received image of ID document 104. In some implementations, the detected identifying data corresponds to data items in the data grouping of structure 204. For example, the identifying data can include text characters that correspond to at least one of: a height of the individual; eye color of the individual; a hair color of the individual; an age of the individual; or a gender of the individual.

In the example operation, computing device 102 determines a second confidence score associated with a first text field of the detected identifying data. The first text field can correspond to the first detected biometric attribute. For example, if the first detected biometric attribute is age of the individual depicted in photographic image 124, the corresponding first text field is a written/text character description of the age of the individual depicted in image 124.

In some implementations, determining the second confidence score associated with the first text field of the detected identifying data can include computing device 102 analyzing text characters of the one or more text fields. Additionally, determining the second confidence score can be based on the analysis of the text characters, and can further include computing device 102 providing an indication of the extent to which the first text field of the detected identifying data matches a particular text field of the identification document.

For example, computing device 102 executes program code associated with logic 112 to analyze text characters of the received image of ID document 104. The executed program code can extract or recognize the height of the individual depicted on ID document 104, extract/recognize the eye color of the individual depicted on the document, or extract/recognize the age of the individual depicted on the document. In some implementations, program code associated with scoring logic 116 receives parameter values corresponding to the analyzed text characters (i.e., height, eye color, age). Program code for scoring logic 116 is then executed to determine a corresponding confidence score with reference to data structure 204 and CM block 210.

The second confidence score represents the system confidence that, for example, the recognized age (e.g., as determined from OCR scans) matches or substantially corresponds to the actual text of the individual's age depicted on the analyzed image of ID document 104 (and the actual ID document 104). In some instances, the detected first text field states the individual is age 31 and the second confidence score is 5 (MED) In another instance, the detected first text field states the individual is height 6 ft and the second confidence score is 9 (HIGH). In yet another instance, the detected first text field states the individual is eye color green and the second confidence score is 3 (LOW).

Referring again to the example operation, computing device 102 detects at least one encoded data item associated with ID document 104. In some implementations, the detected encoded data item corresponds to encoded data 118, indicator 120, or biometric marker 122. Detecting the at least one encoded data item can include computing device 102 executing program code to analyze encoded data viewable in the received image of ID document 104. Additionally, detecting the encoded data item can further include computing device 102 decoding the encoded data.

In some implementations, decoding the encoded data enables system 100 to identify a variety of information associated with the individual, owner, or cardholder of ID document 104, or information associated with the issuing entity of ID document 104. In some implementations, the at least one encoded data item encodes biometric attributes of the individual or encodes identifying data or other data associated with the issuing entity or issuing of authority of ID document 104.

Computing device 102 determines a third confidence score associated with decoded data that corresponds to the detected at least one encoded data item. In some implementations, determining the third confidence score can include computing device 102 analyzing the received image of ID document 104. Additionally, determining the third confidence score can be based on the analysis of the image and the decoding of any data encoded in the data item. Determining the third confidence score can further include computing device 102 providing an indication of the extent to which the detected and decoded data item matches data encoded within ID document 104.

For example, computing device 102 executes program code associated with logic 114 to analyze the received image to detect and decode data 118, to detect and decode indicator 120, and to detect and decode biometric marker 122. In some implementations, program code associated with scoring logic 116 receives parameter values corresponding to the analyzed preceding encoded data items (e.g., bar code, watermark, fingerprint). Program code for scoring logic 116 can then be executed to determine a corresponding confidence score with reference to data structure 206 and CM block 212.

The third confidence score represents the system confidence that, for example, the decoded barcode data matches or substantially corresponds to the actual encoded barcode data in the analyzed image. In some instances, the detected and decoded data item is a personal identifier such as a social security number and the third confidence score is 5 (MED) In another instance, the detected and decoded data item is a biometric attribute such as age 31 and the third confidence score is 9 (HIGH). In yet another instance, the detected and decoded data item is another biometric attribute such as eye color brown and the first confidence score is 8 (HIGH).

Figure 3:
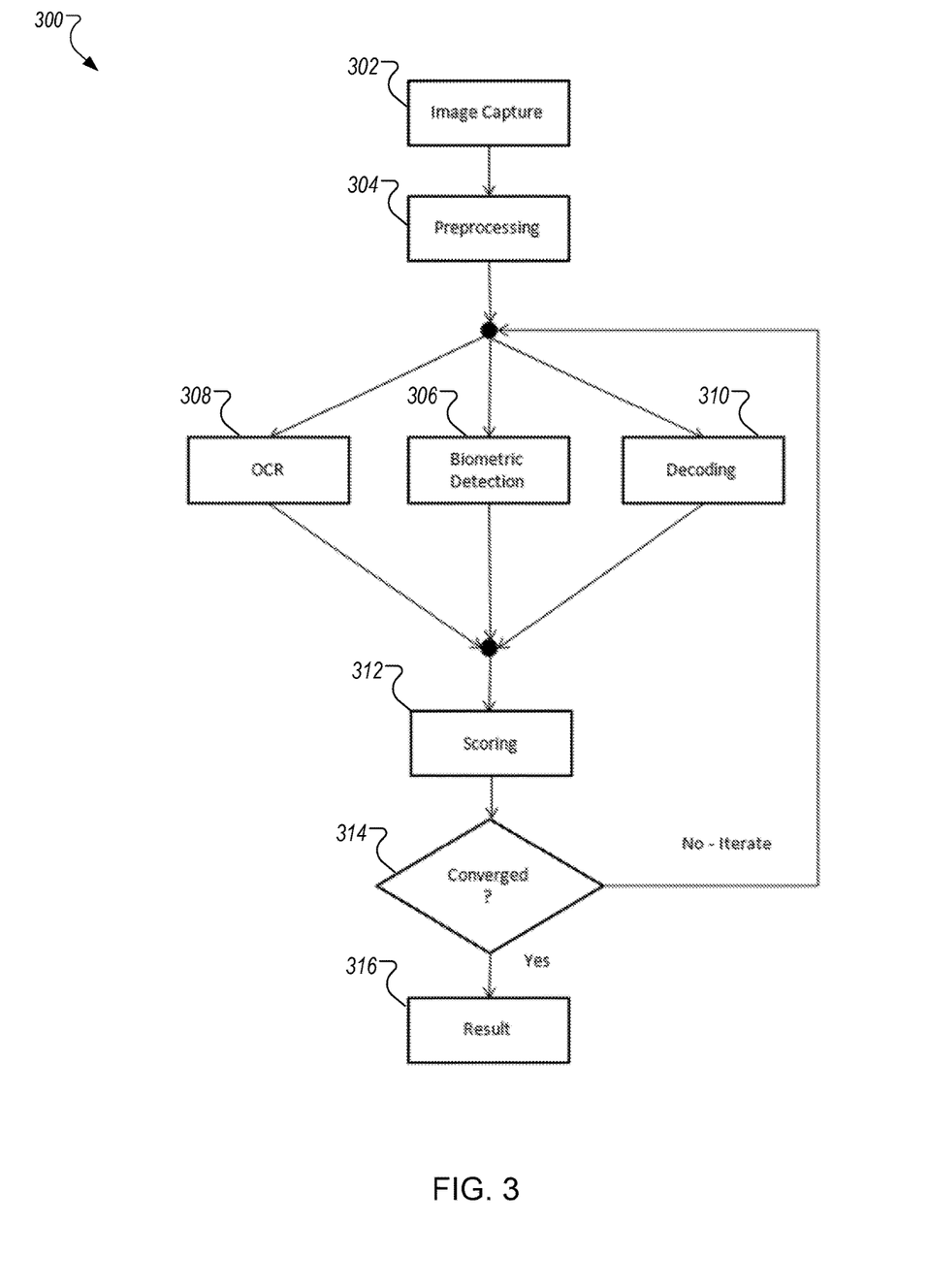
FIG. 3 illustrates a first example process for acquiring information for identity document data validation.

FIG. 3 illustrates a first example process 300 for acquiring information for identity document data validation. Process 300 can be used for cross-validating biometric and/or demographic information associated with an example identification document such as document 104. In some implementations, the steps of process 300 can be implemented by systems 100, 200 and the components and logic constructs that associated with the respective systems.

Process 300 begins at image capture block 302 and includes an example computing device capturing or receiving image data of an identification/identity document. The image data can include biometric data from the identity images (e.g. portrait, fingerprints), biometric text fields (e.g. height, eye color, hair color, date of birth), barcodes, watermarks and other example encoded data.

At pre-processing block 304, process 300 pre-processes all received biometric image data and text image data. In some implementations, preprocessing includes the computing device executing program code to filter, recolor, rotate, sharpen, enhance a digital characteristic of any received identifying data about an example individual. Preprocessing can further include preparing the data for biometric detection, preparing for OCR scanning and/or text field detection, and preparing for digital decoding of encoded data (barcodes, watermarks) as well as any other encoded or visible data.

At biometric detection block 306, process 300 determines the type of biometric image data (e.g., self-portrait) and detects the associated biometric features (e.g., hair color, eye color, age, gender, height) and determines the associated confidence measures. Likewise, at OCR/text detection block 308, for documents with one or more text fields, process 300 applies or executes an OCR scan to read data fields and to determine the associated confidence measures.

At data decoding block 310, process 300 detects and decodes encoded data items and collects confidence measures/scores associated with any encoded data present in the identification document. As shown in FIG. 3, processes associated with detection blocks 306, 308, and 310 can occur in parallel. At scoring block 312, process 300 examines the output of biometric detection block 306, OCR/text detection block 308, and decoded data block 310. Based on the analyzed outputs, process 300 determines, for example, if there is a discrepancy among any redundant biometric indicators. Process 300 analyzes the detected output data and confidence scores to determine the source of the discrepancy.

For example, if the confidence levels for eye color from the portrait, OCR text and barcodes are high, but there is a discrepancy among the detected/decoded attribute, it is relatively probable that there may be a manufacturing defect or data input error associated with the identification document. Alternatively, for example, if there is a discrepancy associated with a low confidence measure from OCR/text detection, it can be relatively probable that there is an OCR/text error.

Another example discrepancy can potentially indicate fraudulent use of the identification document. For example, decoded data can indicate a first set of biometric values while OCR/text detection and/or biometric image data detection can indicate a second set of biometric values that differ from the first set. In some implementations, system 100 can detect that there is a discrepancy between the biometric values of decoded data and biometric values of the detected biometric/OCR data. For reliable and authentic encoded data (barcode/fingerprint) that is decoded with a high confidence score, such a detected discrepancy can potentially indicate that a current cardholder of the ID document is attempting to use the document in a fraudulent manner.

At convergence block 314, when one or more determined confidence scores are below a threshold confidence score, process 300 can execute an iteration logic sequence. This logic sequence and corresponds to a feedback loop that returns to process blocks 306, 308, and 310 to execute a subsequent iteration of OCR, biometric, and encoded data detection. For example, in this iteration sequence, process 300 can repeat detection steps using feedback from the determined confidence levels/scores.

For example, biometric image data used for face detection may indicate brown eyes with a relatively high confidence score while OCR text detection may indicate green eyes with a relatively low confidence score. Thus, a discrepancy exists relative to the detected biometric attribute for eye color of the individual and the detected OCR text for eye color on the ID document.

If the preceding discrepancy occurs, process 300 can adjust data parameters used to execute OCR text detection, initiate a new text scan (e.g., initiate a feedback process), and generate a revised data set of detected text values of biometric data. Process 300 can then reexamine the collective confidence scores for detected eye color attributes until there is convergence between, for example, detected eye color and CM scores for biometric detection and OCR text detection.

If process 300 determines that there is convergence, or that convergence is not likely to occur, the process proceeds to results block 316 and either generates a result indicating convergence, generates a result indicating a confirmed data discrepancy, or generates a result indicating potential fraudulent use of the identification document. The results generally provide an indication associated with the authenticity of the identification document.

Figure 4:
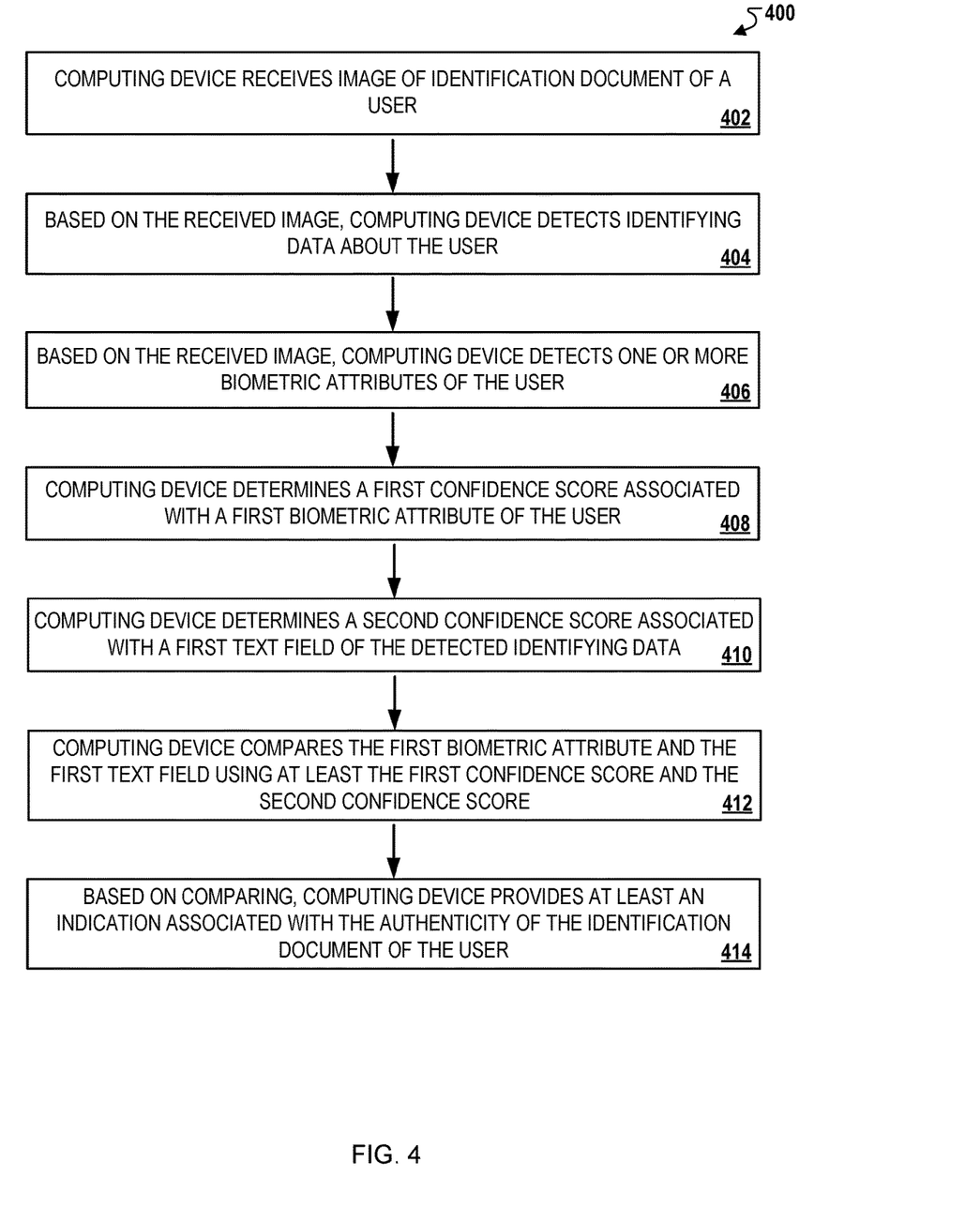
FIG. 4 illustrates a second example process for acquiring information for identity document data validation.

FIG. 4 illustrates a second example process for acquiring information for identity document data validation. In some implementations, process 400 may be performed by system 100 and system 200 discussed above. Thus, the following description of process 400 can reference one or more features of the described systems 100 and 200.

In some implementations, process 400 is performed, at least, by one or more processors included in computing device 102 of systems 100 and 200. The one or more processors of computing device 102 can execute instructions or program code stored in a memory unit of the device. Execution of the stored instructions facilitate acquiring or receiving information for validating identity document data against biometric image data. The one or more processors can also use data, such as demographic information, digital image data and identity records, that are stored in database 108 or other related databases (not shown).

Process 400 begins at block 402 and includes computing device 102 of system 100 receiving an image of identification document 104 of an individual. At block 404 process 400 include system 100 detecting identifying data about the individual. The identifying data is detected based on the received image and can include one or more text fields viewable within the identification document. At block 406 process 400 includes system 100 detecting one or more biometric attributes of the individual. The one or more biometric attributes are also detected based on the received image and can correspond to physical human features such as height, age or gender.

At block 408 process 400 includes computing device 102 determining a first confidence score associated with a first biometric attribute of the individual that is detected by the computing device. In some implementations, the first confidence score indicates the extent to which the detected first biometric attribute matches a particular physical human feature of the individual. At block 410, computing system 100 determines a second confidence score associated with a first text field of the detected identifying data. The first text field can correspond to the first biometric attribute and provides a description of the first biometric attribute using text characters.

At block 412 process 400 includes system 100 comparing the first biometric attribute and the first text field using at least the first confidence score and the second confidence score. Based on comparing, computing device 102 can then generate an indication associated with the authenticity of the identification document of the individual. In some implementations, computing system 102 uses results or parameter values generated during the comparing step to generate the indication associated with the authenticity of the identification. For example, the indication associated with authenticity can indicate that identification document 104 at least one of: is an authentic identification, includes a discrepancy, or is potentially a fraudulent identification document 104.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computer-implemented method comprising:
   receiving, by a computing device, an image of an identification document of an individual;
   detecting, by the computing device and based on the received image, identifying data about the individual, the identifying data including one or more text fields;
   detecting, by the computing device and based on the received image, one or more biometric attributes of the individual;
   determining, by the computing device, a first confidence score associated with a first biometric attribute of the individual that is detected by the computing device;
   determining, by the computing device, a second confidence score associated with a first text field of the detected identifying data, the first text field corresponding to the first biometric attribute;
   comparing, by the computing device, the first biometric attribute and the first text field using at least the first confidence score and the second confidence score; and
   based on comparing, providing, by the computing device, an indication associated with the authenticity of the identification document of the individual.

2. The computer-implemented method of claim 1, wherein the received image of the identification document includes a digital image of the individual and detecting the one or more biometric attributes of the individual, comprises:
   executing, by the computing device, program code to analyze physical human features viewable in the digital image; and
   identifying, by the computing device, the one or more biometric attributes of the individual based on the analyzed physical human features.

3. The computer-implemented method of claim 2, wherein the detected one or more biometric attributes of the individual includes at least one of: a height of the individual; eye color of the individual; a hair color of the individual; an age of the individual; or a gender of the individual.

4. The computer-implemented method of claim 3, wherein determining the first confidence score associated with the first biometric attribute of the individual, comprises:
   analyzing, by the computing device, the digital image of the individual; and based on analyzing, providing, by the computing device, an indication of the extent to which the detected first biometric attribute matches a particular physical human feature of the individual.

5. The computer-implemented method of claim 1, wherein the identifying data including the one or more text fields corresponds to text describing biometric attributes of the individual; and
    detecting, comprises:
        using, by the computing device, an optical character recognition (OCR) algorithm to scan and recognize text characters of the one or more text fields.

6. The computer-implemented method of claim 5, wherein the identification document includes text describing one or more biometric attributes of the individual, and wherein the detected identifying data about the individual is scanned and extracted from the received image of the identification document.

7. The computer-implemented method of claim 6, wherein determining the second confidence score associated with the first text field, comprises:
    analyzing, by the computing device, text characters of the one or more text fields; and
    based on analyzing, providing, by the computing device, an indication of the extent to which the first text field of the detected identifying data matches a particular text field of the identification document.

8. The computer-implemented method of claim 1, further comprising:
    processing, by the computing device, the received image of the identification document of the individual, wherein processing enhances a digital characteristic of the identifying data about the individual.

9. The computer-implemented method of claim 1, wherein receiving the image of the identification document of the individual includes at least one of:
    capturing, by the computing device, a digital image of the identification document;
    scanning, by the computing device, the identification document; and
    receiving, by the computing device, manually entered identifying data about the individual.

10. The computer-implemented method of claim 1, further comprising:
    detecting, by the computing device, at least one encoded data item associated with the identification document of the individual; and
    determining, by the computing device, a third confidence score associated with decoded data that corresponds to the detected at least one encoded data item.

11. The computer-implemented method of claim 10, further comprising:
    detecting, by the computing device, a discrepancy between at least the first confidence score and the second confidence score; and
    executing a feedback operation that uses at least the first and second confidence scores to perform a subsequent iteration of at least one of:
    detecting identifying data about the individual;
    detecting one or more biometric attributes of the individual; or
    detecting at least one encoded data item associated with the identification document of the individual.

12. An electronic system comprising:
    one or more processors; and
    a one or more machine-readable storage units for storing instructions that are executable by the one or more processors to cause performance of operations comprising:
        receiving, by a computing device, an image of an identification document of an individual;
        detecting, by the computing device and based on the received image, identifying data about the individual, the identifying data including one or more text fields;
        detecting, by the computing device and based on the received image, one or more biometric attributes of the individual;
        determining, by the computing device, a first confidence score associated with a first biometric attribute of the individual that is detected by the computing device;
        determining, by the computing device, a second confidence score associated with a first text field of the detected identifying data, the first text field corresponding to the first biometric attribute;
        comparing, by the computing device, the first biometric attribute and the first text field using at least the first confidence score and the second confidence score; and
        based on comparing, providing, by the computing device, an indication associated with the authenticity of the identification document of the individual.

13. The electronic system of claim 12, wherein the received image of the identification document includes a digital image of the individual and detecting the one or more biometric attributes of the individual, comprises:
    executing, by the computing device, program code to analyze physical human features viewable in the digital image; and
    identifying, by the computing device, the one or more biometric attributes of the individual based on the analyzed physical human features.

14. The electronic system of claim 13, wherein the detected one or more biometric attributes of the individual includes at least one of: a height of the individual; eye color of the individual; a hair color of the individual; an age of the individual; or a gender of the individual.

15. The electronic system of claim 14, wherein determining the first confidence score associated with the first biometric attribute of the individual, comprises:
    analyzing, by the computing device, the digital image of the individual; and
    based on analyzing, providing, by the computing device, an indication of the extent to which the detected first biometric attribute matches a particular physical human feature of the individual.

16. The electronic system of claim 12, wherein the identifying data including the one or more text fields corresponds to text describing biometric attributes of the individual; and
    detecting, comprises:
        using, by the computing device, an optical character recognition (OCR) algorithm to scan and recognize text characters of the one or more text fields.

17. The electronic system of claim 16, wherein the identification document includes text describing one or more biometric attributes of the individual, and wherein the detected identifying data about the individual is scanned and extracted from the received image of the identification document.

18. The electronic system of claim 17, wherein determining the second confidence score associated with the first text field, comprises:
  analyzing, by the computing device, text characters of the one or more text fields; and
  based on analyzing, providing, by the computing device, an indication of the extent to which the first text field of the detected identifying data matches a particular text field of the identification document.

19. The electronic system of claim 12, wherein the operations further comprise:
  processing, by the computing device, the received image of the identification document of the individual, wherein processing enhances a digital characteristic of the identifying data about the individual.

20. The electronic system of claim 12, wherein receiving the image of the identification document of the individual includes at least one of:
  capturing, by the computing device, a digital image of the identification document;
  scanning, by the computing device, the identification document; and
  receiving, by the computing device, manually entered identifying data about the individual.

21. The electronic system of claim 12, wherein the operations further comprise:
  detecting, by the computing device, at least one encoded data item associated with the identification document of the individual; and
  determining, by the computing device, a third confidence score associated with decoded data that corresponds to the detected at least one encoded data item.

22. The electronic system of claim 21, wherein the operations further comprise:
  detecting, by the computing device, a discrepancy between at least the first confidence score and the second confidence score; and
  executing a feedback operation that uses at least the first and second confidence scores to perform a subsequent iteration of at least one of:
  detecting identifying data about the individual;
  detecting one or more biometric attributes of the individual; or
  detecting at least one encoded data item associated with the identification document of the individual.

23. A non-transitory computer storage unit disposed in a data processing device and encoded with a computer program, the program comprising instructions that are executed by one or more processors to cause performance of operations comprising:
  receiving, by a computing device, an image of an identification document of an individual;
  detecting, by the computing device and based on the received image, identifying data about the individual, the identifying data including one or more text fields;
  detecting, by the computing device and based on the received image, one or more biometric attributes of the individual;
  determining, by the computing device, a first confidence score associated with a first biometric attribute of the individual that is detected by the computing device;
  determining, by the computing device, a second confidence score associated with a first text field of the detected identifying data, the first text field corresponding to the first biometric attribute;
  comparing, by the computing device, the first biometric attribute and the first text field using at least the first confidence score and the second confidence score; and
  based on comparing, providing, by the computing device, an indication associated with the authenticity of the identification document of the individual.

* * * * *